Dec. 16, 1969  D. E. GROSVENOR ET AL  3,483,913
METHOD OF MOLTEN METAL SEPARATION
Filed March 22, 1967  2 Sheets-Sheet 2
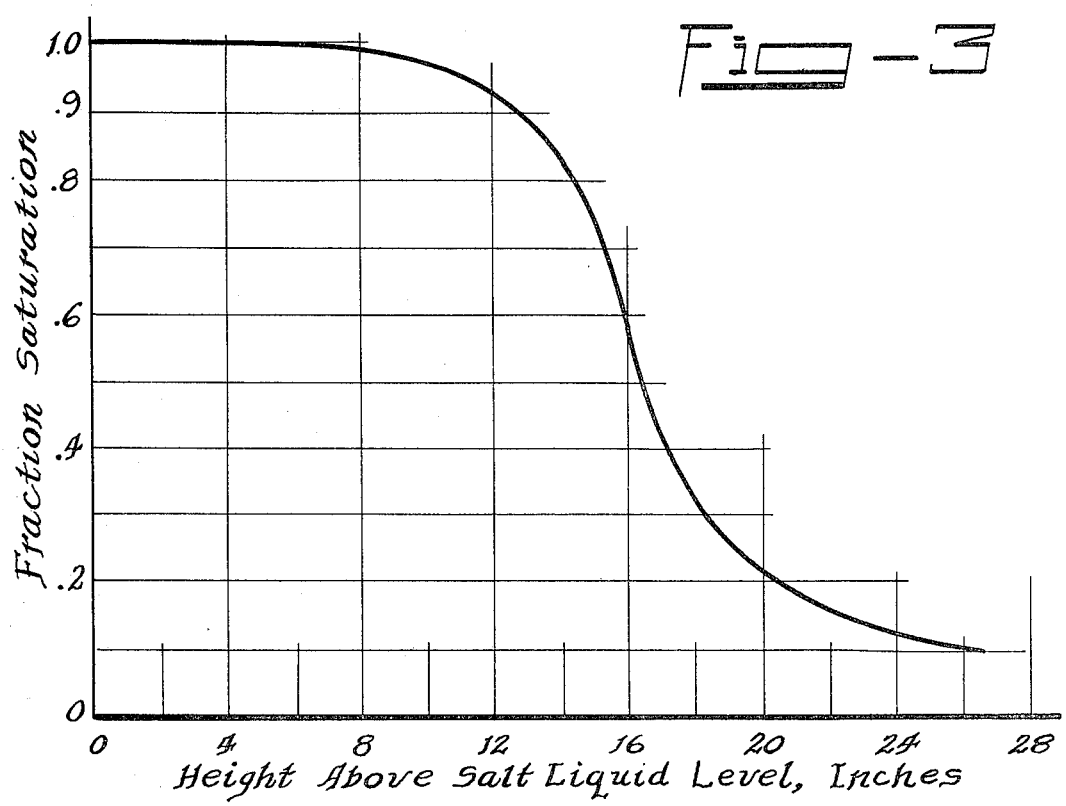
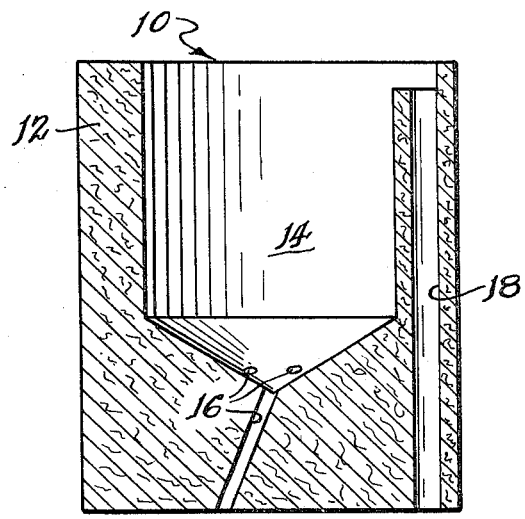
Inventors
David E. Grosvenor
William E. Miller
By:
Attorney United States Patent Office 3,483,913
Patented Dec. 16, 1969

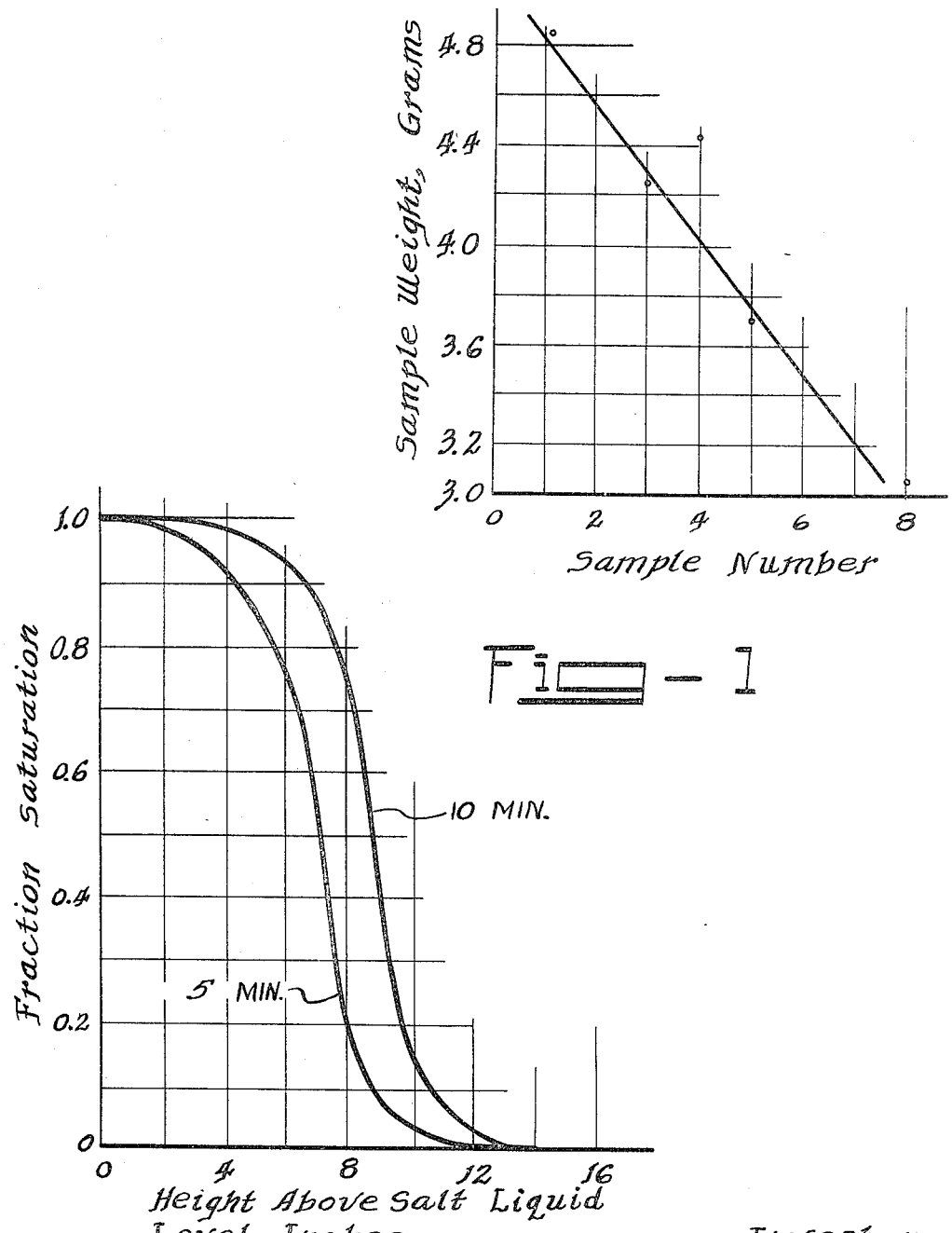

3,483,913
METHOD OF MOLTEN METAL SEPARATION
David E. Grosvenor, Burr Ridge, and William E. Miller, Naperville, Ill., assignors to the United States of America as represented by the United States Atomic Energy Commission
Filed Mar. 22, 1967, Ser. No. 625,919
Int. Cl. B22d 27/20
U.S. Cl. 164—55        5 Claims

ABSTRACT OF THE DISCLOSURE

A method of separating molten metal from various mixtures of molten metal with either molten salt or molten metal oxides or combinations of both by contacting the mixtures with a fibrous refractory material which preferentially absorbs the molten salt and/or molten metal oxides.

CONTRACTURAL ORIGIN OF THE INVENTION

The invention described herein was made in the course of, or under, a contract with the United States Atomic Energy Commission.

BACKGROUND OF THE INVENTION

This invention relates to a method of separating molten metals from mixtures of molten metals and molten metal salts, from mixtures of molten metals and molten metal oxides and from combinations thereof and more particularly to a method in which fibrous refractory material is used to preferentially absorb molten salts and/ or molten metal oxides from the aforementioned mixtures.

Pyrochemical techniques have been developed within the past few years for separation of uranium and plutonium values from each other and from unwanted fission products present in used nuclear fuel elements. These techniques involve the use of a plurality of molten metal solutions in contact with a molten salt. For instance, uranium and plutonium values may be dissolved in a molten copper-magnesium solution which, in turn, is in contact with a molten salt such as magnesium chloride. When an equilibrium has been established between the molten salt and the molten copper-magnesium solution, most of the plutonium and uranium values, which exist in the copper-magnesium solution in their most reduced state, are oxidized by the salt and transfer to it, while refractory and noble metal fission products remain in the copper-magnesium solution. Other molten metal solutions in contact with the molten salt have different solubilities with respect to the plutonium and the uranium values. That is, one solution is a good solvent for plutonium but not for uranium and the other solution is a good solvent for uranium but not for plutonium. When equilibria are attained between the molten salt containing the plutonium and uranium values and the aforementioned solvent solutions, the plutonium and uranium values will transfer to the solvent solution with the greatest respective solubility for each. By carefully choosing the solvents, good separation of uranium from plutonium can be achieved. For instance, a zinc-70 w/o magnesium solution may be used to separate uranium values, while a zinc-15 w/o magnesium solution may be used to separate plutonium values. Once the uranium and the plutonium values have been separated from each other and the molten salt, they must be recovered from the zinc-magnesium solvent solutions.

One method for effecting a separation of uranium or plutonium values from the solvent solution is to retort the solvent, but this produces a plutonium or uranium residue tightly bound to the retort crucible, and the residue is contaminated by small amounts of both molten salt and solvent solution. Two methods are available for removing this residue from the crucible. Enough solvent metal solution may be added to completely dissolve the residue in the crucible and then the solvent material may be distilled, but not only does this leave the uranium or plutonium contaminated by the salt but also the amount of solvent metal necessary to dissolve the residue renders the equipment size prohibitive. The other method is to contact the residue with hydrogen which fractures the residue and allows it to be removed from the crucible. However, it has been found that the presence of a small amount of salt covering the residue in the crucible prevents effective hydrogen contact. It is therefore obvious that, in order to facilitate the use of pyrochemical separation techniques for recovery of uranium and plutonium values from used nuclear fuel, it is necessary to find a method to remove molten salt from the combination of uranium or plutonium and the solvent metal.

It has been discovered that contacting mixtures of molten metal and molten salts, mixtures of molten metal oxides and molten metals and combinations thereof with a fibrous refractory material results in the preferential absorption of molten salt and/or molten metal oxides from the mixture by the fibrous refractory material.

This discovery has applications beside the separation of molten salt from uranium and plutonium values in pyrochemical processes. This discovery may be applied to storage of radioactive materials and also to casting of molten metals besides the actinides. When used or spent nuclear fuel materials are processed by pyrochemical separation techniques as described above, the molten salt becomes radioactive and the problem of storing the salt must be met. Since fibrous refractory material may absorb 5 to 10 times its weight in molten salt, it can be used as a convenient method for storing large amounts of radioactive salts in a relatively small space. Another way in which this invention may be used is in the casting of fuel elements in which the casting mold is made of fibrous refractory material. The nuclear material in the form of molten metal may be poured with a molten salt carrier into fibrous refractory molds which absorb the molten salt, leaving a formed ingot of nuclear material essentially free of contaminants.

SUMMARY OF THE INVENTION

This invention involves a method of separating molten metals from mixtures of molten metals and molten salts, from mixtures of molten metal oxides and molten metal and combinations thereof by contacting the mixture with a fibrous refractory material which preferentially absorbs the molten salts and/or molten metal oxides from the mixture.

BRIEF DESCRIPTION OF THE DRAWING

FIG. 1 is a plot of the weight of a section of a cylinder immersed in salt as a function of the height of the section above the salt liquid level.

FIG. 2 is a plot of the fraction of sample saturation as a function of sample height above the salt liquid level.

FIG. 3 is a plot similar to FIG. 2 but for a different density sample.

FIG. 4 is a cross-sectional view of a molten salt flux trap.

DESCRIPTION OF PREFERRED EMBODIMENTS

While any fibrous refractory material could have been used in the following experiments, Fiberfrax, a registered trademark of the Carborundum Co. for a fibrous refractory material consisting of 51.2% $Al_2O_3$, 47.4% $SiO_2$, 0.7% $B_2O_3$ and 0.7% $Na_2O$, and WRPX, produced by the Refractory Products Co. and consisting of 46.2% $Al_2O_3$, 52.5% $SiO_2$, 0.65% $B_2O_3$ and 0.65% $Na_2O$, were chosen for most of the experiments because of their availability and because they can be obtained with various strand lengths, strand diameters and densities.

EXAMPLE I

WRPX cylinders 5 inches long and 9/16 inch in diameter were contacted at a temperature of 700° C. with a molten salt consisting of $CaCl_2$-NaCl eutectic with 1% of $PbCl_2$ and 1% of $CdCl_2$ dissolved in the eutectic. The cylinders were submerged 1 inch in the salt with the axes of the cylinders vertical to the plane of the surface of the liquid salt. The cylinders were in contact with the salt for 1, 2 and 3 minutes, after which the cylinders were removed and cut into wafers of ½-inch thickness and then weighed. At the time this experiment was performed, a satisfactory method of accurately sectioning the cylinders had not been devised, so that precision-length samples were not obtained. FIG. 1 shows the results of the 1-minute saturation test. As will be noted, the submerged segment did not become saturated when contacted with the salt for 1 minute and the amount of salt absorbed by the cylinder seems to be a linearly decreasing function of the height above the salt. Whatever scattering of the data points occurred is believed to have been due to imprecision in preparing the samples. All the samples were subjected to X-ray fluorescence analysis to determine the Pb/Cd ratio. The results show random scattering among all specimens.

EXAMPLE II

WRPX cylinders 17 inches long and 5/8 inch in diameter were outgassed under vacuum at 700° C. and then supported vertically over a molten salt bath with one end submerged in the bath to a depth of 1 inch. The salt was identical to the salt in the previous example. The rods and the salt were maintained at 700° C. After a given period of submergence in the salt, the rods were withdrawn and cooled. Thereafter the rods were sectioned into wafers with an abrasive wheel and weighed to determine the salt content. FIG. 2 shows the weight distribution of salt along the WRPX cylinders for different submergence times. These curves permit a prediction of the quantity of salt which would be absorbed by a rod of uniform diameter in contact with the salt for a given amount of time. For instance, the area under the curve marked "5 minutes" on FIG. 2 divided by the rectangular area bounded by a height of 12 inches and a fraction saturation of 1.0 is the fraction of saturation in the entire 12-inch rod. This fraction of saturation multiplied by the product of the weight of the rod and its saturation value will give the total salt pickup in the rod in the time interval. The result is independent of cross-sectional area of the rod as long as the rod is uniform along its entire length. The density of the fibers has a direct effect on the amount of salt absorbed. In the first two examples, the WRPX had a density of 0.3 g./cm.³ and in both examples the saturation value was 6.5 grams of salt per gram of WRPX.

EXAMPLE III

A Fiberfrax rod 29 inches in length was fabricated from Fiberfrax with a density of 0.5 g./cm.³. This rod was submerged for 22 hours in a salt similar to that used above. FIG. 3 shows the quantity of salt absorbed by the rod as a function of the rod height above the salt liquid level. As will be noted, the curve indicates that, even for a 22-hour time span, a saturation upper limit had not been reached. While the WRPX of Examples I and II with a density of 0.3 g./cm.³ had a saturation of 6.5 grams of salt per gram of WRPX, the 0.5 g./cm.³ Fiberfrax had a saturation of 3.4 grams of salt per gram of Fiberfrax. Therefore, the less dense the Fiberfrax the greater its saturation value.

The following two examples are directly related to the problems encountered in the pyrochemical separation techniques hereinbefore described. After uranium or plutonium values have transferred from a molten salt flux to a solvent alloy, the uranium or plutonium-solvent solution is formed into an ingot in a graphite mold before transfer to a retort crucible. Example IV is concerned with separation of molten salt flux from a combination of the flux and solvent solution containing uranium values before the solvent-uranium solution is formed into an ingot for transfer to the retorting crucible. Example V is directed to the problem of removing any residual salt flux present after the majority of the solvent has been removed by retorting. Cadmium was used in Example V instead of a zinc-magnesium alloy because cadmium is easier to handle at retorting temperatures than is a zinc-magnesium alloy.

EXAMPLE IV

FIG. 4 shows a molten salt flux trap 10 with walls 12 made from a silica-alumina felt. Flux trap 10 has a central cavity 14, a plurality of drain holes 16 and an overflow hole 18. A molten mixture of zinc-12% magnesium-12% uranium contaminated with molten salt was used as a substitute for the product of the above-described pyrochemical processes and was introduced into central cavity 14 of flux trap 10. The molten metal quickly passed through drain holes 16, while the molten salt was absorbed by the felt walls 12, thereby effecting a separation of the molten salt from the molten metal.

EXAMPLE V 1.7 kilograms of cadmium and 100.5 grams of a flux consisting of $MgCl_2$-30 m/o NaCl-20 m/o KCl were melted in a stainless steel beaker and the temperature of the melt was adjusted to and maintained at 700° C. A rod of silica-alumina fibers 1½ inches in diameter and 6¼ inches long was lowered into the melt to a depth of about 1 inch. Although the rod was free-floating, it remained substantially vertical due to the restraint of the apparatus walls. In 45 seconds the first sign of cadmium fumes was observed and in 55 seconds heavy fuming was evident. The initial flux layer was about ¼ inch in thickness which normally prevents fuming, and the subsequent fuming signaled the removal of the protective flux layer. After 2½ minutes the rod was withdrawn from the melt and weighed. 95.5 grams of flux had been absorbed or a removal of 95% of the flux present. No cadmium pickup by the rod was observed, although cadmium oxide present as a contaminant was deposited on the outside of the rod. The cadmium metal surface was clean and shiny except for small particles of flux present at the beaker walls.

The above experiment not only shows the applicability of this invention to the pyrochemical process but also the feasibility of molding metal by pouring a slurry of molten metal, molten salt and/or metal oxides into a mold made of a fibrous refractory material. The mold would absorb the salt and or metal oxides and leave the metal in the desired shape. This molding process would be useful for the fabrication of fuel elements or uranium or plutonium metal.

The above-described experiments show some of the many uses to which this discovery applies. They are meant to be descriptive, not definitive, as is the purpose of the appended claims.

The embodiments of the invention in which an exclusive property or privilege is claimed are defined as follows:

1. A method comprising:
   contacting a mixture of a molten actinide metal and a molten salt or oxide or mixtures thereof with a refractory fibrous body consisting essentially of alumina and silica fibers whereby the molten salt or oxide is preferentially absorbed by the refractory fibrous body.

2. The method of claim 1 wherein the mixture of molten actinide metal and molten salt or oxide is poured into a casing mold to form an ingot and the molten salt or oxide is preferentially absorbed by contact with the refractory fibrous body while the actinide metal and salt or oxide are still molten.

3. The method of claim 2 wherein the casing mold is formed of the refractory fibrous body whereby the molten salt or oxide is preferentially absorbed by said mold, and further comprising the step of cooling the remaining molten metal to form a casting.

4. The method of claim 3 wherein the molten metal and molten metal oxides are uranium or plutonium and uranium oxides of plutonium oxides.

5. The method of claim 4 wherein the refractory fibrous body is used to remove radioactive salt flux from the molten metal and further comprising the step of storing said fibrous body containing the radioactive salt.

References Cited

UNITED STATES PATENTS

| | | | |
|---|---|---|---|
| 2,882,568 | 4/1959 | Leaberry et al. | 164—138 |
| 3,387,969 | 6/1968 | Skladzien | 75—66 |
| 2,757,425 | 8/1956 | Duncan et al. | 164—134 |

FOREIGN PATENTS 1,384,280  11/1964  France.

J. SPENCER OVERHOLSER, Primary Examiner

R. SPENCER ANNEAR, Assistant Examiner

U.S. Cl. X.R.

75—84.1, 93; 164—72, 134; 210—24, 508; 266—34